United States Patent [19]

Hasegawa et al.

[11] 4,042,440

[45] Aug. 16, 1977

[54] METHOD AND APPARATUS FOR SPLICING OF VENEER SHEETS

[75] Inventors: Katsuji Hasegawa; Yukio Takagi, both of Nagoya; Sachio Naito, Ohbu; Kenichi Hiraiwa, Nagoya; Eiji Takasu, Nagoya, all of Japan

[73] Assignee: Meinan Machinery Works, Inc., Ohbu, Japan

[21] Appl. No.: 659,476

[22] Filed: Feb. 19, 1976

[30] Foreign Application Priority Data

Feb. 20, 1975 Japan .................................. 50-21665

[51] Int. Cl.[2] ......................... B32B 31/12; B32B 31/18

[52] U.S. Cl. .................................... 156/304; 156/357; 156/363; 156/508; 156/558

[58] Field of Search ................. 156/91, 157, 159, 250, 156/256, 258, 290, 291, 304, 353, 356, 357, 360, 362, 363, 502, 505, 508, 509, 517, 507, 556, 558

[56] References Cited

U.S. PATENT DOCUMENTS

| | | | |
|---|---|---|---|
| 3,547,735 | 12/1970 | Ortel | 156/304 |
| 3,562,045 | 2/1971 | Hasegawa | 156/159 |
| 3,686,057 | 8/1972 | Ortel | 156/91 |
| 3,849,222 | 11/1974 | Ortel | 156/291 |
| 3,855,039 | 12/1974 | Boettcher | 156/91 |
| 3,915,790 | 10/1975 | Haug | 156/509 |

*Primary Examiner*—Charles E. Van Horn
*Assistant Examiner*—John E. Kittle
*Attorney, Agent, or Firm*—Blanchard, Flynn, Thiel, Boutell & Tanis

[57] ABSTRACT

A method and apparatus of splicing a train for veneer sheets being fed in a horizontal direction on infeed and outfeed conveyors operated by electric sensors that signal the conveyors to start or to stop at predetermined appropriate times when the preceding and succeeding veneer sheets pass certain predetermined positions, coordinated with application of a strand and beads of a thermoplastic adhesive onto said train of the veneer sheets on conveyors by a cold press. According to this method and apparatus, the splicing of veneer sheets may be achieved with an increased speed and strength of splicing in the transverse direction, in comparison with conventional method and apparatus.

15 Claims, 14 Drawing Figures

METHOD AND APPARATUS FOR SPLICING OF VENEER SHEETS

FIELD OF THE INVENTION

The present invention relates to a method and an apparatus for splicing veneer sheets to each other by means of strands that carry a thermoplastic adhesive or a hot-melt adhesive.

BACKGROUND OF THE INVENTION

It has already been proposed to apply strands carrying or impregnated with the above-mentioned adhesives on the surfaces of veneer sheets for the purpose of increasing the bonding strength of veneer sheets, in lieu of using a gummed tape an adhesive-backed tape.

With this method, it has been found that although an increased bonding strength between the veneer sheets is attained in the feeding direction of the veneer sheets due to the tensile strength of the strands applied thereon, the spliced veneer sheets will easily separate from each other due to a concentrated external force applied thereto when the spliced portions of the veneer sheets are subjected to a shearing or bending force.

This shortcoming is due to the fact that the surface area covered by strands bonded on the veneer sheets is so limited that it is difficult to maintain a sufficient bond between the veneer sheets. This has been the greatest disadvantage of the veneer sheet splicing apparatus of this kind.

In order to overcome this drawback, it has been attempted to apply a number of strands, conventionally, on one or both sides of the veneer sheets to maintain the bonding strength between each veneer sheet to be spliced.

This method, however, not only leads to economical disadvantages because an increased number of strands or quantity of adhesives must be used but, also, to the degradation of final products caused by the adverse effects of the thermoplastic adhesives being excessively mixed with the thermosetting adhesive which is used during the manufacturing process of plywood.

It is the object of present invention, therefore, to provide a method and an apparatus for splicing veneer sheets which provides an increased bonding strength between each veneer sheet in the transverse direction.

Essentially, according to the present invention, there is provided a method of splicing veneer sheets fed with appropriate spacings therebetween in a predetermined direction and then brought into substantially tight end-to-end abutment against each other, by cold pressing at least one strand supplied from above said fed veneer sheets and carrying with a thermoplastic adhesive onto the surface of a preceding veneer sheet by means of a cooling roll rotatably supported above said preceding veneer sheet at a first position, comprising the steps of: stopping the feed of a preceding veneer sheet at the moment the rear end of said preceding veneer sheet arrives at a second position on the infeed side of and spaced from said first position by a predetermined distance; feeding a succeeding veneer sheet until the front-end of said succeeding veneer sheet arrives at said second position; applying a thermoplastic adhesive bead in a molten state onto said strand at a localized portion thereof on the infeed side of the cooling roll, the length the strand between said first position and the localized portion of the strand is equal to the distance between said first and second positions, feeding a train of said preceding veneer sheet and said succeeding veneer sheet in said predetermined direction to make said thermoplastic adhesive bead pass said first position whereby said thermoplastic adhesive bead is cold pressed and applied onto the abutting end-portions of said preceding veneer sheet and said succeeding veneer sheet in the form of an adhesive film containing part of said strand therein, said adhesive film having a substantial area and spanning the preceding and succeeding veneer sheets.

BRIEF DESCRIPTION OF THE DRAWINGS

In the accompanying drawings illustrating embodiments of the present invention.

DETAILED DESCRIPTION OF THE DRAWINGS

Figure 1:
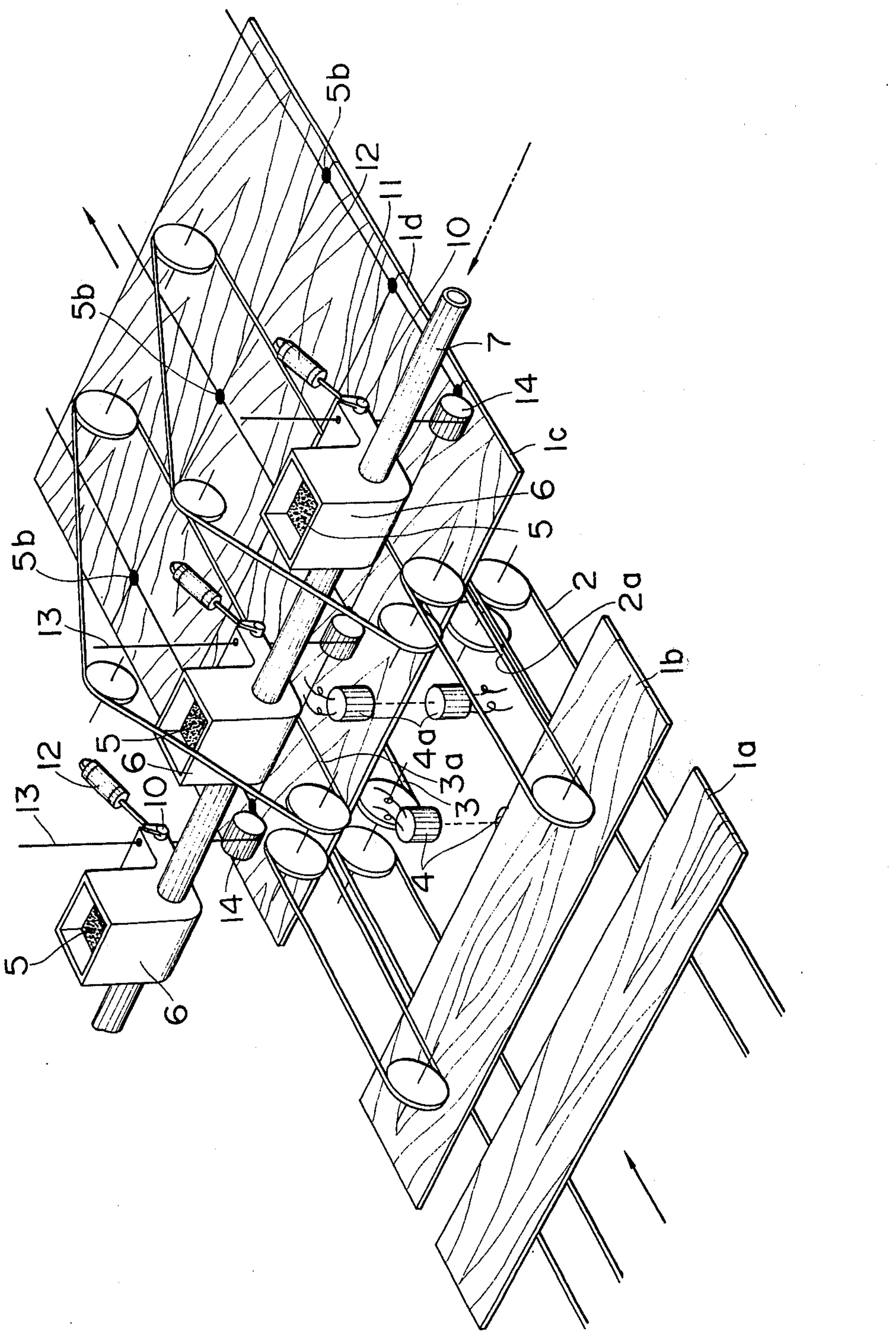
FIG. 1 is a perspective view of one form of apparatus embodying the present invention.

Referring now to FIG. 1, there is provided an infeed conveyor comprising infeed conveyor belts 2 and **2*a*, each being trained about a wheel rotatably supported on a frame (not shown). There is also provided an outfeed conveyor comprising outfeed conveyor belts 3 and 3*a*, on the outfeed side of said infeed conveyor belts 2 and 2*a*, each being trained about a wheel rotatably supported on said frame. Said infeed conveyor belts 2 and 2*a* are adapted to hold a veneer sheet therebetween for feeding the veneer sheet in a predetermined direction at a fixed and uniform speed while said outfeed conveyor belts 3 and 3*a* are adapted to hold a veneer sheet therebetween for feeding the veneer sheet in said predetermined direction at said fixed and uniform speed. The rear-end portions of said outfeed conveyor face the front-end portions of said infeed conveyor to feed a veneer sheet from the infeed conveyor to the outfeed conveyor in said predetermined direction. Above the outfeed conveyor, there is provided a cooling roll 14 adapted to press against a veneer sheet at a first position. Said outfeed conveyor is driven at a fixed and uniform speed, but intermittently, by a driving gear using an electro-clutch brake, etc. (not shown). On the other hand, said infeed conveyor is driven at said fixed and uniform speed and continuously by a motor (not shown) in order to bring the front-end of a succeeding veneer sheet 1*b* into substantially tight abutment against the rear-end of a preceding veneer sheet 1*c* at a second position. In the vicinity of the rear-end portion of the outfeed conveyor there is provided a sensor 4*a* using a photoelectric tube to sense the arrival of the rear-end of the preceding veneer sheet 1***c* at said second position, and to transmit a signal to stop said intermittent driving gear immediately. Similarly, in the vicinity of the front-end portion of the infeed conveyor there is provided a sensor 4 using a photoelectric tube to sense the arrival of the front-end of the succeeding veneer sheet 1*b* in the vicinity of the front-end portion of the infeed conveyor and transmit a signal to actuate said intermittent driving gear after a predetermined period of time, to wit, the moment the front-end of said succeeding veneer sheet is brought into substantially tight abutment against the rear-end of said preceding veneer sheet 1*c* at said second position and to actuate an actuator 12 which will be explained later.

Above said outfeed conveyor belts 3 and 3*a* there are provided a plurality of tanks 6 aligned in the transverse direction and supported by a heating pipe 7 that passes through said tanks, is rotatable therein and is journaled by the frame. Steam is supplied from outside to pass through the inside of said heating pipe 7.

Figure 2:
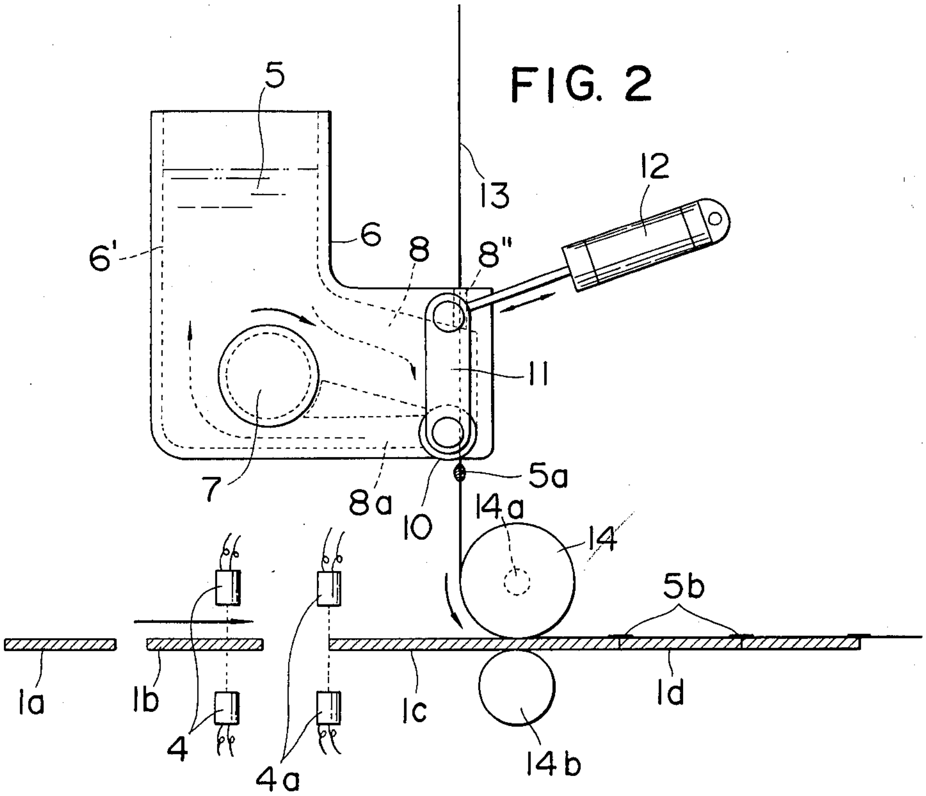
FIG. 2 is a side elevational view of the embodiment shown in FIG. 1, with infeed conveyor belts and outfeed conveyor belts omitted.
Figure 4A:
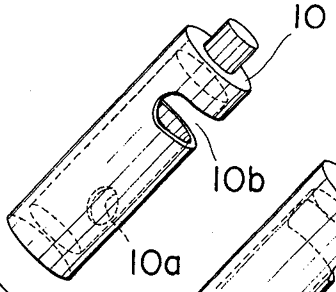
Figure 4B:
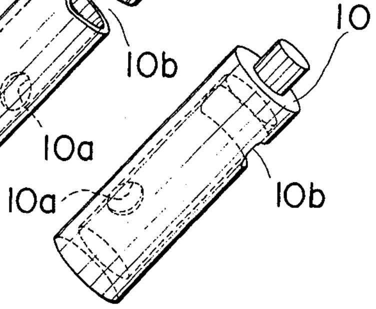
Figure 3:
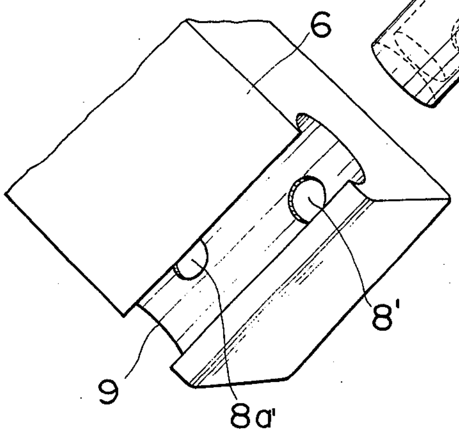
FIG. 3 is a perspective illustration of the bottom portion of a tank, viewed from below, for an adhesive used in this invention, showing a notched portion formed thereon, FIG. **4*a* and FIG. 4*b* are perspective views of a hollow cylinder-shaped control valve body designed to be slidably engaged in said notched portion of the bottom portion shown in FIG. 3, FIG. 5*a* and FIG. 5*b* are perspective illustrations of the tank viewed from below, showing the respective circumferential positions of the hollow cylinder-shaped control valve body engaged in the notched portion.

Referring to FIG. 2, FIG. 3, FIG. 4*a* and FIG. 4*b*, a circulating system 6' is formed inside each of said tanks 6 and said tanks are filled with a thermoplastic adhesive 5 or a hot-melt adhesive. Said circulating system 6' includes an outlet conduit 8 and an inlet conduit 8*a*. Said heating pipe 7 also passes through said circulating system 6', as depicted, to maintain the thermoplastic adhesive in the tank 6 in a molten state and is adapted to rotate in the direction of the arrow so that the adhesive 5 in a tank 6 is made to flow from the inlet conduit 8*a* through the outlet conduit 8, thence through a controlling opening 10*b* which will be explained later, to the inside of a control valve body 10 which will be explained later, and thence through a controlling opening 10*a* which will be explained later and back to the inlet 8*a* due to its viscosity owing to the rotation of the heating pipe 7. The bottom portion of said tank 6 has a notch 9 so shaped as to receive the cylinder-shaped valve body as shown in FIG. 3. On the inside wall of the notch 9 there are provided an outlet 8' leading to said outlet conduit 8 and an inlet 8*a'* leading to said inlet conduit 8*a*. The position of said outlet 8' and the position of said inlet 8*a'* are staggered or offset from each other in the circumferential direction. In said notch 9, there is disposed a hollow cylinder-shaped control valve body 10 that is rotatable on its longitudinal axis. Said hollow cylinder-shaped control valve body 10 has a small controlling opening 10*a* and a large controlling opening 10*b*. The axial position of said controlling opening 10*a* is the same as that of the inlet 8*a'* and so that said controlling opening 10*a* is connected to or disconnected from the inlet 8*a'* as the control valve body 10 rotates on its axis within a predetermined angle. The circumferential position of said controlling opening 10*b* is adapted to include that of the inlet 8' so that said controlling opening 10*b* may be adapted to communicate with both of the inlet conduit 8 through the inlet 8' and the outside of the tank all the time, to wit, throughout the circumferential rotation of the control valve body. The tank 6 is provided with a hole 8" through which is led a strand 13 from the outside. Said hole 8" communicates with the circulating system 6' of the tank 6. Therefore, the strand 13 comes in the outside and passes through said hole 8", the circulation system 6, the inlet 8' and the controlling opening 10*b*, and is led to the outside. Said strand 13 is further held between said roll 14 and a veneer sheet at said first position as shown in FIG. 2 while being cold pressed by the roll 14 onto the veneer sheet. An end of said control valve body 10 to extends outside of the tank 6. An actuator 12 comprising a piston and cylinder is rotatably connected to the frame (not shown). Said end of the control valve body 10 is rigidly connected to one end of an arm 11 and the other end of said arm 11 is, in turn, rotatably connected to the piston rod of said actuator 12. Said actuator is adapted to function in response to a signal transmitted when the front-end of a succeeding veneer sheet 1*b* is sensed by the sensor 4.

Above the outfeed conveyor, there is provided a cooling roll 14 preferably made of a metal. Said cooling roll 14 is adapted to cold press the strand 13 supplied from above through the tank 6 onto the preceding veneer sheet at said first position. Said cooling roll is provided with a cooling pipe 14*a* through which cooling water flows.

Figure 5A:
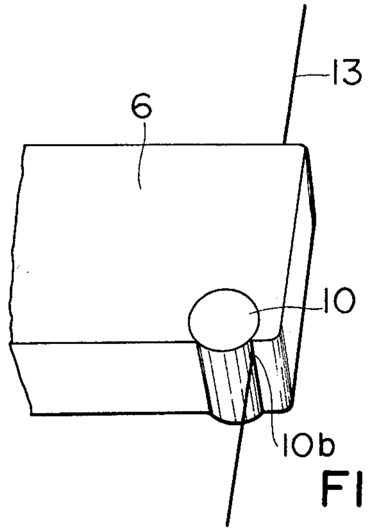

Referring to FIG. 5*a*, only a small portion of said controlling opening 10*b* appears from the edge of notch 9 in the illustrated position of the valve 10.

Figure 5B:
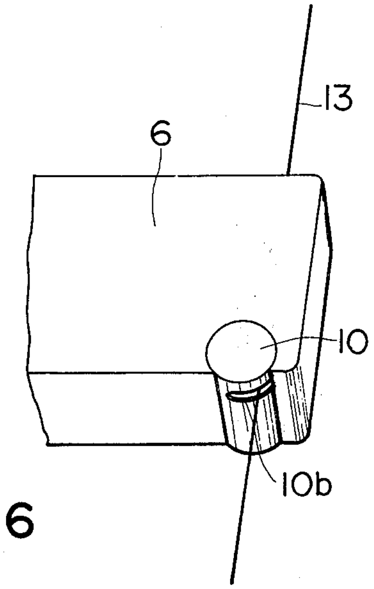

Referring to FIG. 5*b*, in the illustrated position of the valve 10, a substantial portion of said controlling opening 10*b* appears from an edge of the notch 9 whereby to apply a thermoplastic adhesive bead in a molten state onto said strand at a localized portion thereof on the infeed side of said first position. The length of the strand between said localized portion and said first position is equal to the distance between said first position (i.e., the rear edge of sheet 1*c*) and said second position.

OPERATION

In operation, said preceding veneer sheet is fed the predetermined direction at said fixed and uniform speed and transferred from the infeed conveyor to the outfeed conveyor. When the rearend of the preceding veneer sheet 1*c* arrives at said second position and is sensed by the sensor 4*a*, said sensor 4*a* transmits a signal to the intermittent driving gear of the outfeed conveyor to stop the feed of said preceding veneer sheet. Then, the front-end of the succeeding veneer sheet 1*b*, which is continuously fed by the infeed conveyor, is sensed by the sensor 4 to transmit a signal for energizing the actuator 12 to rotate the control valve body 10 on its axis. By this action the controlling opening 10*a* of control valve body 10, which has so far communicated with the inlet conduit 8*a* of the circulating system 6' by way of the inlet 8*a'*, is brought out of communication from the inlet conduit 8*a* due to the circumferential movement of the controlling opening 10*a* caused by rotation of valve body 10. On the other hand, the controlling opening 10*b* not only stays in communication with the inlet conduit 8 of the circulating system 6', but also appears from the edge of notch 9 as shown in FIG. 5*b*. As a result, a comparatively large quantity of the adhesive 5 is applied on strand 13, in a bead form, at a localized portion thereof on the infeed side of said first position in such a way that the length of strand between said first position and the localized portion of the strand is equal to the distance between said first and second positions.

Similarly, when the front end of the succeeding veneer sheet 1*b* is sensed by the sensor 4 on its arrival in the vicinity of said second position a signal is transmitted for energizing the outfeed conveyor at the moment said front-end of the succeeding veneer sheet 1*b* comes into substantially tight abutment against said rear end of the preceding veneer sheet 1*c* at said second position. Consequently, a train of the preceding veneer sheet and the succeeding veneer sheet is fed in a predetermined direction at said fixed and uniform speed. During its feed, the strand 13 is cold pressed and applied onto said preceding veneer sheet by means of the cooling roll 14. As a result, the thermoplastic adhesive bead 5*a* passes the first position and is cold pressed and applied by the cooling roll 14 onto the abutting end portions of the preceding veneer sheet 1*c* and the succeeding veneer sheet 1*b* and an adhesive film, containing part of said strand 13 therein, extending over a substantial area and spanning the veneer sheets, is formed over the abutting end portions of the veneer sheets. Said train of veneer sheets is further fed in the predetermined direction at said fixed and uniform speed. Also during its feed, the strand 13 is cold pressed and applied onto the succeeding veneer sheet by means of the cooling roll 14 and the preceding and succeeding veneer sheets 1*c* and 1*b* are firmly spliced to each and other.

When all veneer sheets fed for splicing have a fixed length, the sensor 4*a* may be adapted to sense the arrival of the front-end of the preceding veneer sheet 1*c* at said second position and to transmit a signal to de-energize the outfeed conveyor after a predetermined period of a time, to wit, the moment the rear-end of said preceding veneer sheet 1*c* arrives at said second position.

In case the veneer sheets are fed at substantially short intervals, there is no possibility of the thermoplastic adhesive bead being set before it is cold pressed and applied onto the abutting end portions. In such a case the sensor 4*a* may be adapted, instead of sensor 4, to sense the arrival of the rear-end of the preceding veneer sheet 1*c* and transmit a signal to energize actuator 12 so that the thermoplastic adhesive bead 5*a* is applied on the localized portion of strand 13 on the arrival of the rear-end of preceding veneer sheet 1*c* at said second position.

In lieu of photoelectric tubes, limit switches may be used as sensors.

Figure 6:
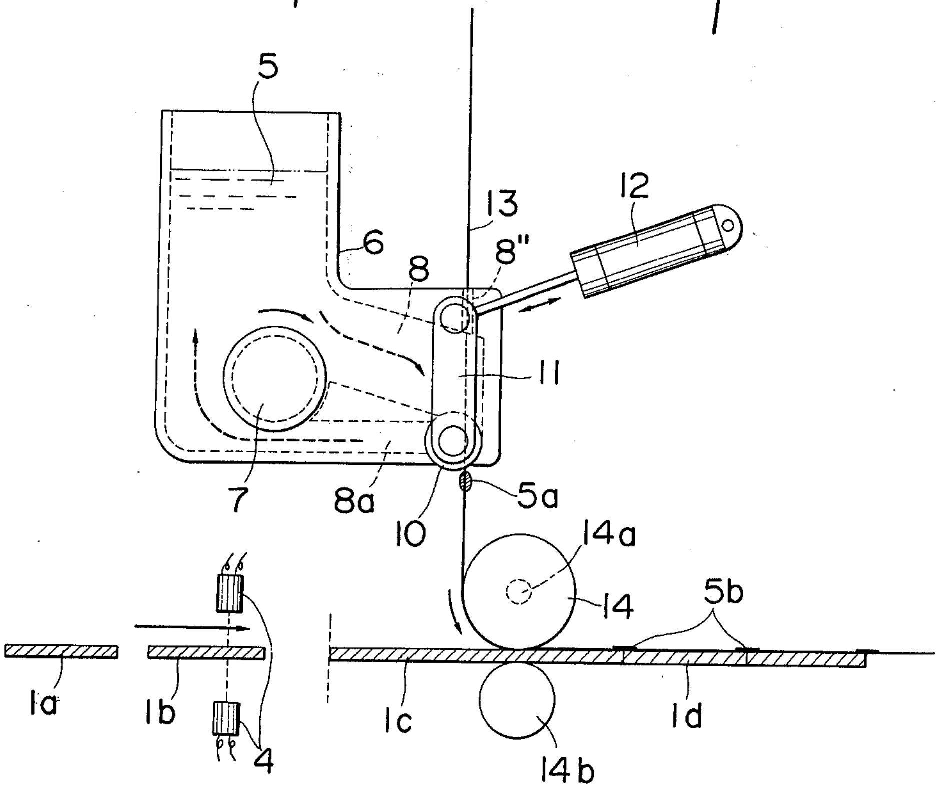
FIG. 6 is a side elevational view of another embodiment of the present invention.

Referring to FIG. 6, it is possible to remove the sensor 4*a* from the embodiment shown in FIG. 1 through FIG. 5*b.* In this case, the function of the sensor 4*a* in the embodiment shown in FIG. 1 through FIG. 5*b,* to wit, the sensing of the rear-end of preceding veneer sheet 1*c,* and the stopping of intermittent driving gear are done by the sensor 4. Illustratively stated, the sensor 4 is adapted to sense the arrival of the rear-end of preceding veneer sheet 1*c* in the vicinity of said second position and to transmit a signal for de-energizing the intermittent driving gear for the outfeed conveyor after a predetermined period of time, to wit, the moment said rear-end of the preceding veneer sheet 1*c* arrives at said second position.

MODIFICATION

A further embodiment of the present invention is illustrated in FIG. 7*a* through FIG. 7*f.* Between the infeed conveyor 2 and the outfeed conveyor 3 that feed a veneer sheet in a predetermined direction at a fixed and uniform speed in a horizontal direction there is provided a roll 16 which is adapted to rotate intermittently. On the outfeed side of said infeed conveyor 2 and above said roll 16 there is provided a sensor 4' to sense the thickness of the veneer sheet and to transmit a signal when there is detected a portion which does not have a sufficient thickness. Further, on the outfeed side of said sensor 4', there is provided a cutter 17 adapted to cut the preceding veneer sheet at its cutting point, and at a second position to clip off the front portion which does not have a sufficient thickness in response to said signal. The roll 16 is also adapted to be stopped in response to said signal after a predetermined period of a time, to wit, the moment said cutting point of the preceding veneer sheet arrives at said second position and to resume rotation immediately after the cutting operation to feed the preceding veneer sheet 1*c.* On the outfeed side of said second position, there is pivotally provided a veneer sheet sorting bar 15 which is adapted to be raised and lowered. Above said veneer sheet sorting bar 15, there is provided a cooling roll 14 adapted to be raised and lowered along with the veneer sheet sorting bar 15 with a space therebetween sufficient enough to permit entry of a veneer sheet. Above the cooling roll 14, there is provided a tank 6 containing a thermoplastic adhesive and a strand 13 applied or impregnated with a thermoplastic adhesive. Said cooling roll 14, tank 6 and strand 13 are provided in the same manner as the embodiments shown in FIG. 1 through FIG. 6 except in that the cooling roll is allowed to be raised and lowered along with the veneer sheet sorting bar 15.

Illustratively stated, the cooling roll 14 is adapted to cold press and apply strand 15, at first position, onto said veneer sheet 1*c.* The cutter 17 is adapted to cut the preceding veneer sheet at its cutting point, at said second position, to clip off the rear and the front-end portions which do not have a sufficient thickness in response to a signal transmitted from sensor 4'. Said tank 6 is provided with a control valve body (not shown) adapted to apply a thermoplastic adhesive bead 5*a* in a molten state onto the strand 13 at localized portion thereof when the succeeding veneer sheet is cut at said second portion. The length of the strand between said first position and the localized portion of the strand is equal to the distance between said first and second positions.

Figure 7A:
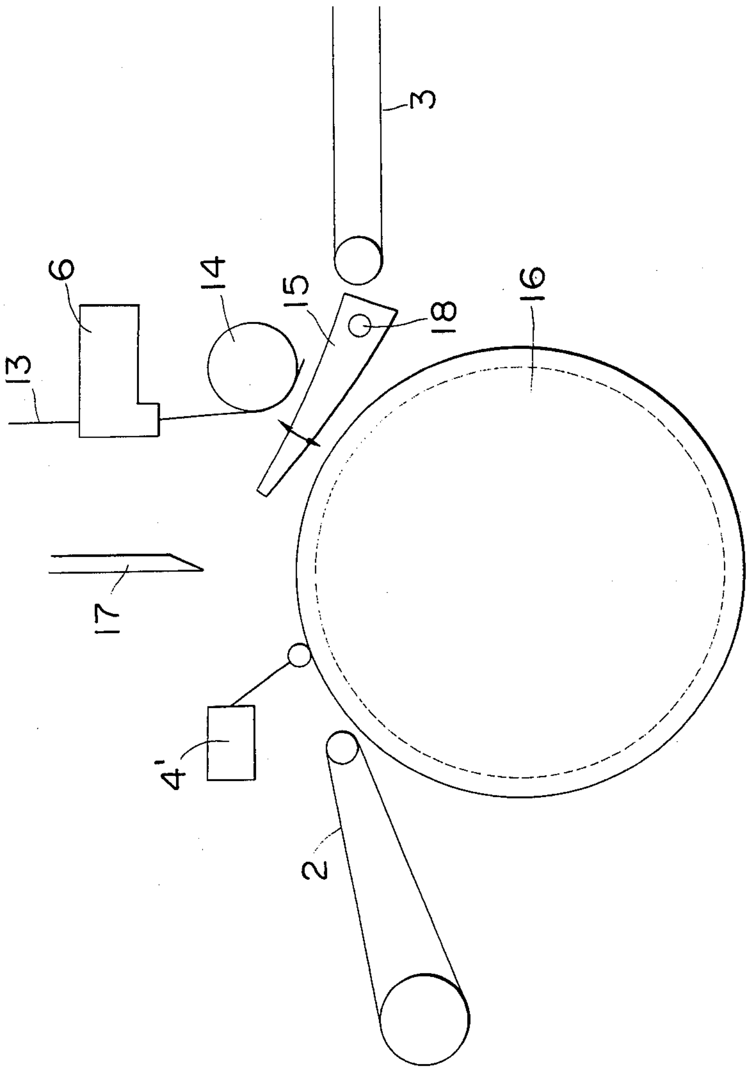
FIGS. 7*a* through 7*f*** are illustrations of the operational sequence of a further embodiment of the present invention.
Figure 7B:
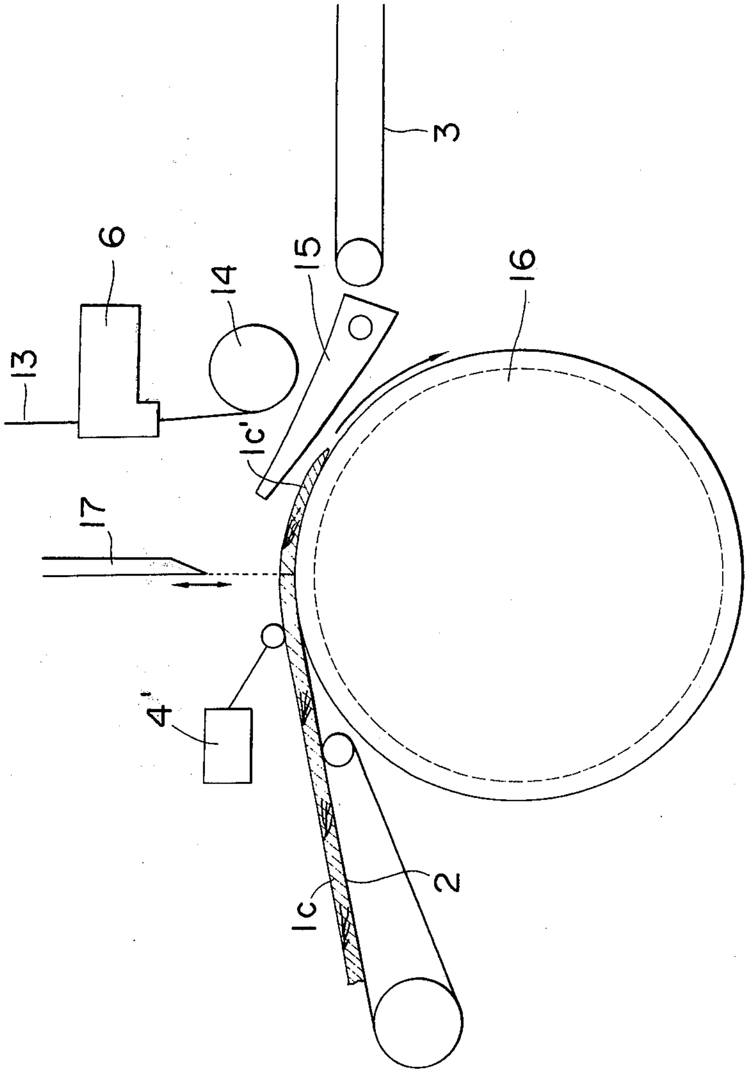
Figure 7C:
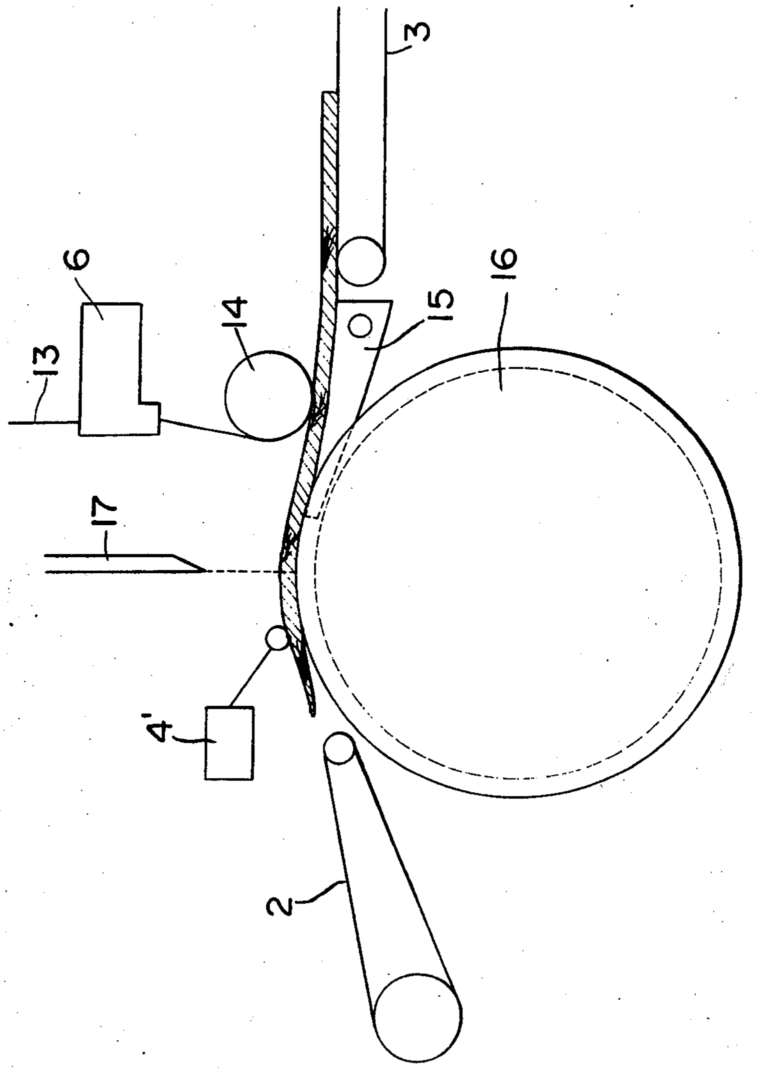
Figure 7D:
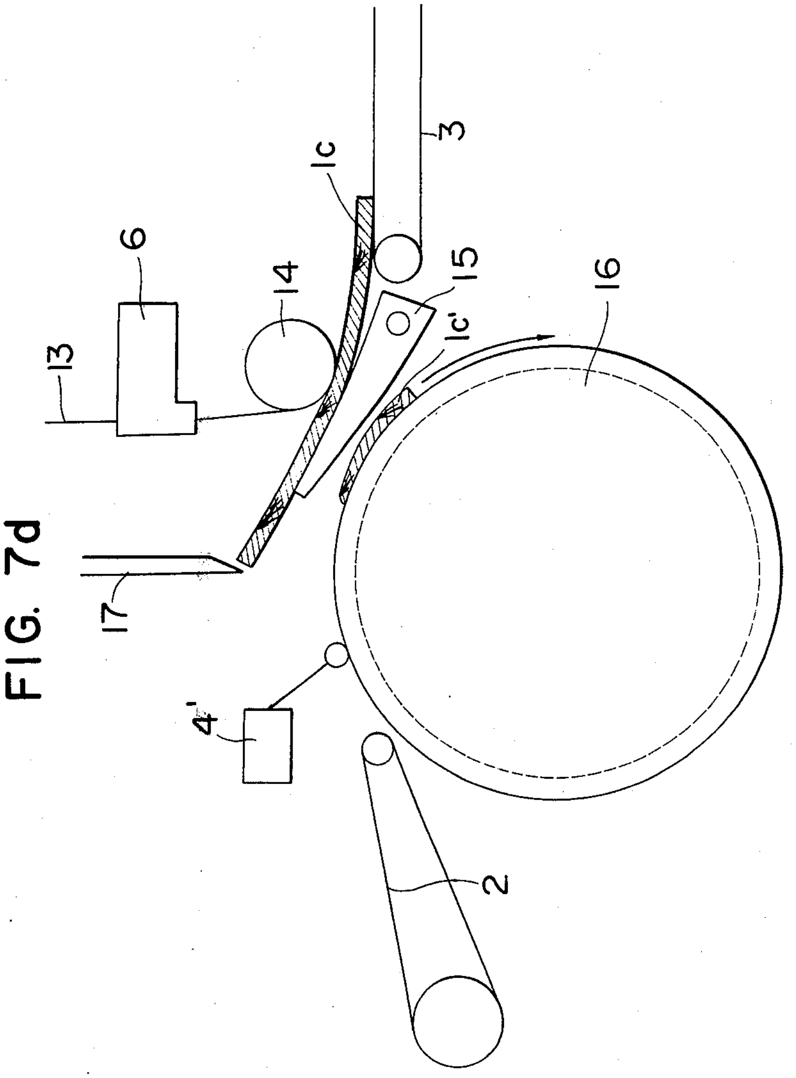
Figure 7E:
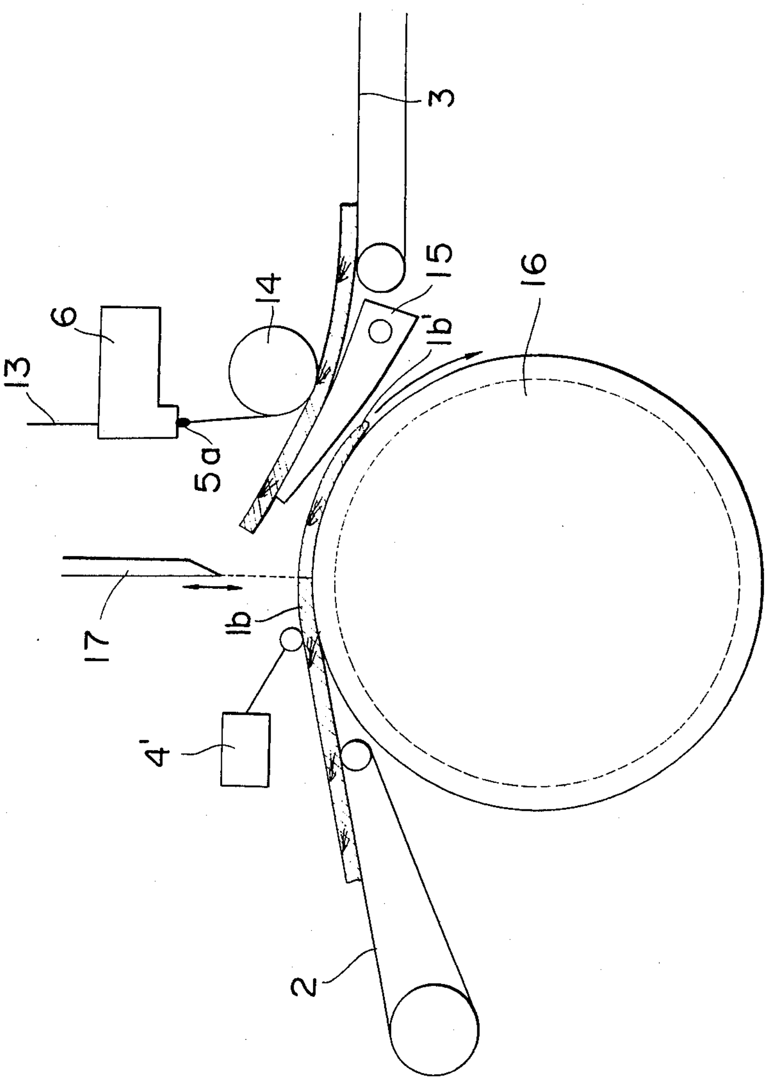
Figure 7F:
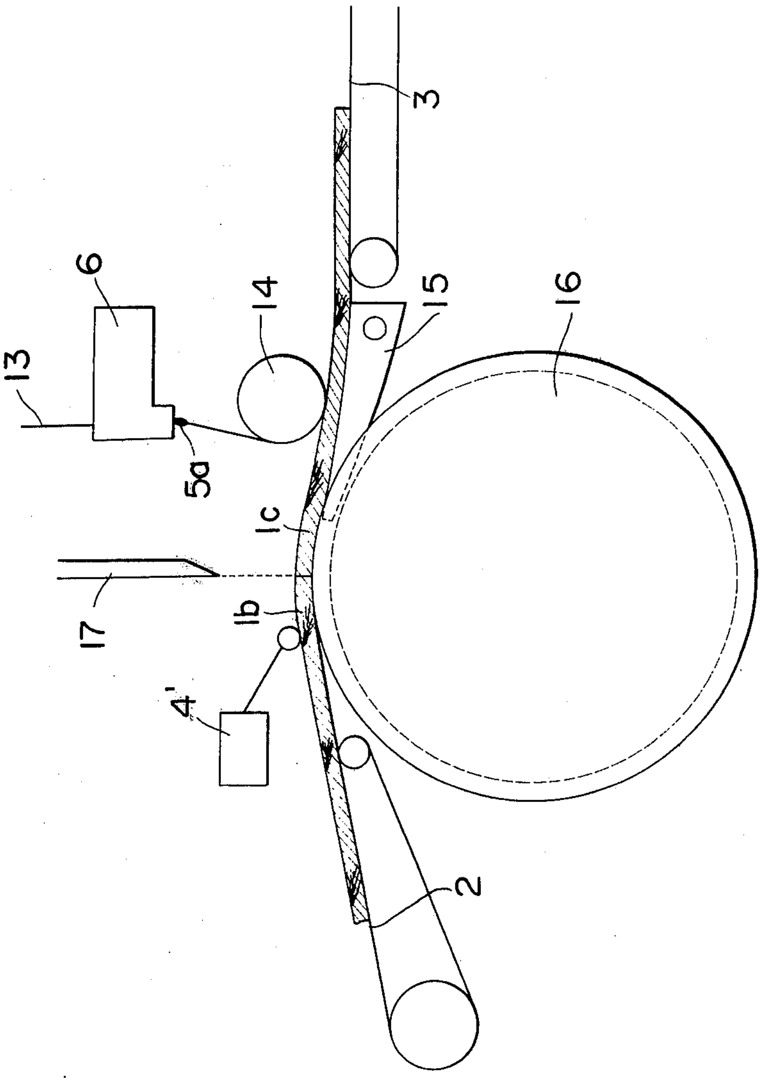

In operation, a preceding veneer sheet 1*c* is fed by the infeed conveyor belt 2 in a horizontal direction at a fixed and uniform speed. When a front side of the preceding veneer sheet 1*c* which does not have enough thickness is sensed by the sensor and said cutting point thereof arrives at said second position, the rotation of roll 16 is stopped and the feed of said preceding veneer sheet 1*c* is simultaneously stopped. The cutter 17 is lowered to cut the preceding veneer sheet at its cutting point at said second position and the front portion 1*c'* thereof is clipped off (FIG. 7*b*). After the clipping, the rotation of roll 16 is resumed and the veneer sheet is again fed in a horizontal direction at said fixed and uniform speed and the veneer scrap 1*c'* will drop because of gravity. Immediately after removal of the veneer scrap 1*c'* the veneer sheet sorting bar 15 which has so far been kept in a raised position is lowered to lead the preceding cut veneer sheet 1*c* to a horizontal direction (FIG. 7*c*). During further feed of veneer sheet 1*c,* the strand 13 is cold pressed and applied at said first position onto said preceding veneer sheet 1*c.* When the rear portion of preceding veneer sheet 1*c* which does not have a sufficient thickness is sensed by the sensor 4', veneer sheet 1*c* is cut at another cutting point thereof at said second position by the cutter 17, which is lowered in response to the signal received from sensor 4' (FIG. 7*c*). After the clipping off, the veneer sheet sorting bar 15 is raised to allow the rear portion 1*c'* to drop because of the gravity, coasting down the roll 16 (FIG. 7*d*). Further, the succeeding veneer sheet 1*b* (FIG. 7*e*) is fed into a direction toward said second position and the front portion 1*b'* which does not have a sufficient thickness is clipped off in the same manner as that of the preceding veneer sheet 1*c*. The veneer scrap 1*b*' drops because of the gravity, after clipping-off operation, coasting down the roll 16. Immediately after removal of the veneer scrap 1*b*', the veneer sheet sorting bar 15 is lowered back to horizontal level to bring the cut rear-end of the preceding veneer sheet 1*c* into substantially tight abutment against the cut front-end of the succeeding veneer sheet 1*b* (FIG. 7*f*). During the clipping operation of the succeeding veneer sheet 1*b*, a thermoplastic adhesive bead in a molten state is applied onto the strand 13 at a localized portion on the infeed side of said first position in such a way that the length of strand between said localized portion and said first position, which is equal to the distance between said first position to said second position.

After the cut rear-end of the preceding veneer sheet 1*c* has been brought into substantially tight abutment with the front end of the succeeding veneer sheet 1*b*, the feeding of the train of veneer sheets is resumed in the a predetermined direction at a fixed and uniform speed horizontally so that the strand 13 is cold pressed by means of a cooling roll 14 onto the preceding veneer sheet 1*c* and the thermoplastic adhesive bead 5*a* passes said first position and is cold pressed and applied onto the abutting end portions of said preceeding veneer sheet 1*c* and of the succeeding veneer sheet 1*b* to cover said abutting end portions with an adhesive film containing part of said strand therein and extending over a substantial area and spanning said veneer sheets. The feed of the train of veneer sheets is further continued into the horizontal direction at said fixed and uniform speed while being cold pressed and applying the strand 13 onto the succeeding veneer sheet 1*b* by means of said cooling roll 14. In this way, the preceding veneer sheet 1*c* and the succeeding veneer sheet 1*b* are spliced to each other.

As mentioned at above, according to the present invention, the veneer sheets may be easily spliced together with an increased speed and bonding strength in the transverse direction in comparison with known conventional methods and apparatus.

Obviously many modifications and variations of the present invention are possible in the light of above teaching. These modifications and variations shall not depart from the scope of the invention as defined by the following claims.

What is claimed is:

1. In a method of splicing veneer sheets which comprises, feeding spaced-apart veneer sheets in a predetermined direction, bringing the veneer sheets into substantially tight end-to-end abutment against each other, cold pressing at least one strand against said veneer sheets and simultaneously applying a thermoplastic adhesive onto the surface of a preceding veneer sheet by means of a cooling means supported at a first position, the improvement which comprises the steps of: stopping the feed of a preceding veneer sheet at the moment the rear-end of said preceding veneer sheet arrives at a second position on the infeed side which is spaced from said first position by a predetermined distance; feeding a succeeding veneer sheet until the front-end of said succeeding veneer sheet arrives at said second position and abuts the rear-end of said preceding veneer sheet; applying a thermoplastic adhesive bead in a molten state onto said strand at a localized portion thereof which is maintained out of engagement with the sheets and is on the infeed side of the cooling means, the length of the strand between said first position and the localized portion of the strand being equal to the distance between said first and second positions; and feeding said preceding veneer sheet and said succeeding veneer sheet in a horizontal direction to cause said length of the strand to be cold pressed against said preceding sheet and to cause said thermoplastic adhesive bead to pass through said first position so that said thermoplastic adhesive bead is cold pressed and applied onto the abutting end portions of said preceding and succeeding veneer sheets in the form of an adhesive film containing part of said strand therein and covering a substantial area which spans the preceding and succeeding veneer sheets.

2. A method according to claim 1, including the steps of sensing the arrival of the rear-end of the preceding veneer sheet at said second position and immediately stopping feeding movement of said preceding veneer sheet, sensing the arrival of the front-end of the succeeding veneer sheet in the vicinity of said second position, and thereupon applying the thermoplastic adhesive bead onto said strand and resuming movement of said preceding veneer sheet and simultaneously continuing to advance said succeeding veneer sheet at the moment said front-end of the succeeding veneer sheet comes into substantially tight abutment against said rear-end of the preceding veneer sheet at said second position.

3. A method according to claim 1, including the steps of sensing the arrival of the front-end of the preceding veneer sheet at said second position and at a selected time thereafter stopping feeding movement of said preceding veneer sheet at the moment the rear-end of said preceding veneer sheet arrives at said second position, sensing the arrival of the front-end of the succeeding veneer sheet in the vicinity of said second position, and thereupon applying the thermoplastic adhesive bead onto said strand and resuming movement of said preceding veneer sheet and simultaneously continuing to advance said succeeding veneer sheet at the moment said front-end of the succeeding veneer sheet comes into substantially tight abutment against said rear-end of the preceding veneer sheet at said second position.

4. A method according to claim 1, including the steps of sensing the arrival of the rear-end of the preceding veneer sheet at said second position and immediately stopping feeding movement of the preceding veneer sheet and simultaneously applying the thermoplastic adhesive bead onto said strand, then sensing the arrival of the front-end of the succeeding veneer sheet in the vicinity of said second position and resuming movement of said preceding veneer sheet and simultaneously continuing to advance said succeeding veneer sheet at the moment said front-end of the succeeding veneer sheet comes into substantially tight abutment against said rear-end of the preceding veneer sheet at said second position.

5. A method according to claim 1, including the steps of sensing the arrival of the rear-end of the preceding veneer sheet in the vicinity of said second position and stopping feeding movement of the preceding veneer sheet at the moment said rear-end of the preceding veneer sheet arrives at said second position, sensing the arrival of the front-end of the succeeding veneer sheet in the vicinity of said second position and thereupon applying the thermoplastic adhesive bead onto said strand, and resuming movement of said preceding veneer sheet and simultaneously continuing to advance said succeeding veneer sheet at the moment said front-end of the succeeding veneer sheet comes into substantially tight abutment against said rear-end of the preceding veneer sheet at said second position.

6. A method according to claim 1, including the steps of cutting off at the second position the unfinished rear-end portion of the preceding veneer sheet and/or the front-end portion of the succeeding veneer sheet when these end portions do not have a sufficient thickness.

7. A method according to claim 6, wherein the cutting-off of the rear-end portion of the preceding veneer sheet is done by stopping the feed of said preceding veneer sheet at the moment a cutting point of the preceding veneer sheet arrives at said second position.

8. A method according to claim 6, wherein the removal of the cut off rear-end portion of the preceding veneer sheet is done by raising the preceding veneer sheet and letting said cut off rear end portion to drop because of gravity.

9. A method according to claim 6, wherein the cutting off of the front-end portion of the succeeding veneer sheet is done by maintaining the preceding veneer sheet in a raised position to allow advance of said front-end portion under the raised preceding veneer sheet, stopping the feed of said succeeding veneer sheet at the moment a cutting point of the succeeding veneer sheet arrives at said second position and cutting the succeeding veneer sheet at said second position.

10. A method according to claim 9, wherein the removal of the cut-off front-end portion of the succeeding veneer sheet is done by maintaining the preceding veneer sheet in a raised position and letting said cut-off front-end portion to drop because of gravity.

11. A method according to claim 9, wherein the rear-end of the preceding veneer sheet and the front-end of the succeeding veneer sheet are brought into substantially tight abutment with each other by lowering back the raised preceding veneer sheet to the original position.

12. A method according to claim 1, including the steps of providing a tank containing said thermoplastic adhesive therein and having a controlled discharge opening which is spaced a substantial distance from said sheets, feeding said strand into said tank and thence out through said discharge opening with the strand then being moved into engagement with said preceding sheet, and applying said molten thermoplastic adhesive to said strand so as to form said bead thereon as the strand passes through the tank, whereby said bead is formed on said strand as it passes through said discharge opening.

13. A method according to claim 12, including the steps of providing a movable control element associated with the discharge opening of said tank for causing beads of molten thermoplastic adhesive to be produced on the strand at spaced intervals therealong as the strand passes through the discharge opening.

14. A method according to claim 12, including the step of moving the strand from said discharge opening toward said preceding sheet in a direction which extends transversely with respect to the direction of movement of the sheets, and said strand having a length which extends between said second position and said discharge opening which is equal to the distance between said first and second positions.

15. An apparatus for splicing veneer sheets fed with appropriate spacings therebetween in a predetermined direction and brought into substantially tight end-to-end abutment against each other, comprising:

an infeed conveyor means for feeding a veneer sheet continuously at a fixed and uniform speed;

an outfeed conveyor means provided on the outfeed side of said infeed conveyor means for intermittently feeding a veneer sheet at a fixed and uniform speed;

tank means containing a thermoplastic adhesive and having a through hole to lead a strand therethrough, said tank means being disposed above the outfeed conveyor means;

a rotatable heating pipe extending through said tank means and being rotatable therein for heating said thermoplastic adhesive;

cooling means provided above said outfeed conveyor means for cold pressing said strand, after it has passed through said tank means, onto a veneer sheet at a first location;

control valve means associated with said through hole for applying, in response to an activating signal, a molten bead of thermoplastic adhesive onto said strand at a localized portion thereof which is disposed on the infeed side of the cooling means and is separated from said first position by a preselected length of said strand, said control valve means being spaced upwardly a substantial distance above said veneer sheet so that the strand moving from said control valve means into said first position is maintained out of engagement with said veneer sheet; and control means for (1) sensing a preceding veneer sheet, (2) transmitting a signal to stop said outfeed conveyor means upon sensing said preceding veneer sheet, (3) sensing a succeeding veneer sheet, (4) permitting said preceding and succeeding veneer sheets to move into substantially tight end-to-end abutment at a second position which is spaced from said first position by a distance which is equal to said preselected length of the strand, and (5) transmitting an activating signal for activating said outfeed conveyor means when said sheets are in said end-to-end abutment at said second position and for activating said control valve means to cause same to apply said molten thermoplastic adhesive bead onto said strand.

* * * * *